(12) United States Patent
Nakashima et al.

(10) Patent No.: US 9,027,676 B2
(45) Date of Patent: May 12, 2015

(54) CONSTRUCTION MACHINE

(75) Inventors: Hajime Nakashima, Hiroshima (JP);
Masaru Numasawa, Hiroshima (JP);
Kazuhiro Ueda, Hiroshima (JP); Zenzo Yamaguchi, Kobe (JP); Yasumasa Kimura, Kobe (JP)

(73) Assignees: Kobelco Construction Machinery Co., Ltd., Hiroshima-shi (JP); Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/233,322

(22) PCT Filed: Jul. 11, 2012

(86) PCT No.: PCT/JP2012/004486
§ 371 (c)(1),
(2), (4) Date: Jan. 16, 2014

(87) PCT Pub. No.: WO2013/011666
PCT Pub. Date: Jan. 24, 2013

(65) Prior Publication Data
US 2014/0144717 A1    May 29, 2014

(30) Foreign Application Priority Data

Jul. 19, 2011    (JP) .................................. 2011-157830

(51) Int. Cl.
*E02F 9/08*    (2006.01)
*F01N 3/05*    (2006.01)
(Continued)

(52) U.S. Cl.
CPC ................ *E02F 9/0866* (2013.01); *F01N 3/05* (2013.01); *F01N 13/082* (2013.01); *B60K 13/04* (2013.01); *B60Y 2200/412* (2013.01); *Y02T 10/20* (2013.01); *B60K 11/06* (2013.01)

(58) Field of Classification Search
CPC ........ E02F 9/0866; F01N 3/05; F01N 13/082; B60K 13/04; B60K 11/06; B60Y 2200/412; Y02T 10/20
USPC .............. 180/9.1, 309, 68.1, 68.2, 68.4, 69.2, 180/89.2, 296; 123/41.56, 41.11, 41.12, 123/41.49; 165/149, 41, 51; 60/320
See application file for complete search history.

(56) References Cited

U.S. PATENT DOCUMENTS

| | | | | |
|---|---|---|---|---|
| 6,427,798 | B1 * | 8/2002 | Imashige ...................... | 180/309 |
| 6,922,925 | B2 * | 8/2005 | Watanabe et al. .............. | 37/466 |
| 2010/0043412 | A1 * | 2/2010 | Dickinson et al. ............. | 60/317 |

FOREIGN PATENT DOCUMENTS

| | | |
|---|---|---|
| JP | 3-229907 | 10/1991 |
| JP | 7-139369 | 5/1995 |

(Continued)

OTHER PUBLICATIONS

English translation of the International Preliminary Report on Patentability and Written Opinion issued Jan. 30, 2014, in PCT/JP2012/004486 filed Jul. 11, 2012.

(Continued)

*Primary Examiner* — Joseph Rocca
*Assistant Examiner* — Jacob Knutson
(74) *Attorney, Agent, or Firm* — Oblon, McClelland, Maier & Neustadt, L.L.P.

(57) ABSTRACT

A construction machine includes: a lower propelling body; and an upper slewing body which is slewably mounted on the lower propelling body. The upper slewing body includes: an engine room provided with an intake opening and a discharge opening; a duct provided in the engine room so as to communicate with the discharge opening; and an exhaust gas pipe which guides exhaust gas discharged from the engine into the duct. The discharge opening and an outlet of the duct are open downward from the engine room. A portion on a distal end side of the exhaust gas pipe is inserted into the duct. The duct and the exhaust gas pipe are configured to cause the exhaust gas to be mixed with cooled air in the duct and cause the mixture of the exhaust gas and the cooled air to be discharged downward from the discharge opening.

10 Claims, 5 Drawing Sheets

(51) Int. Cl.
*F01N 13/08* (2010.01)
*B60K 13/04* (2006.01)
*B60K 11/06* (2006.01)

(56) References Cited

FOREIGN PATENT DOCUMENTS

| JP | 11-257045 A | 9/1999 |
| JP | 2002-174108 | 6/2002 |
| JP | 2009-30559 | 2/2009 |
| JP | 2011-64068 | 3/2011 |

OTHER PUBLICATIONS

International Search Report issued Sep. 18, 2012, in PCT/JP2012/004486, filed Jul. 11, 2012.

Office Action issued Nov. 23, 2014 in Korean Patent Application No. 10-2014-7003849 (with partial English translation).

* cited by examiner

CONSTRUCTION MACHINE

TECHNICAL FIELD

The present invention relates to a construction machine such as a hydraulic shovel provided with a structure for discharging exhaust gas of an engine and cooling air to an outside of an engine room.

BACKGROUND ART

A background art will be described by way of a hydraulic shovel, for example.

FIG. 9 illustrates a small hydraulic shovel called a mini shovel.

The hydraulic shovel includes a lower propelling body 1, an upper slewing body 2 mounted on the lower propelling body 1 so as to be slewable about an axis (central axis of slewing) O perpendicular to the ground, and an excavating device A attached to the front of the upper slewing body 2.

The lower propelling body 1 includes a car body (not illustrated) on which the upper slewing body 2 is mounted and crawler-type propelling devices 3 (only one of them is illustrated) attached to both left and right sides of the car body.

An engine room 6 surrounded by an upper frame 4 and an engine guard member 5 such as a panel or a bonnet is provided at a rear part of the upper frame 4 which forms the upper slewing body 2. An engine 7 and related devices thereof are provided in the engine room 6.

Moreover, a driver's seat 8 and an operation lever (not illustrated) are provided on the engine guard member 5. An operator operates the lever in a state of sitting on the driver's seat 8.

In FIG. 9, reference numeral 9 indicates a canopy which covers the driver's seat 8 from the upper side.

In this small shovel, when hot exhaust gas discharged from the engine is discharged upward directly from the engine room through an exhaust gas pipe (tail pipe), exhaust heat and exhaust sound blow directly toward the operator. Due to this, there is a problem in which the operation environment of the operator gets worse.

A feature disclosed in Patent Document 1 is known as an improvement technique related to a structure for discharging exhaust gas. This known technique will be described with reference to FIG. 10. FIG. 10 is a schematic view of a cross-section of the engine room 6 when seen from a rear side of the engine room 6.

A cooling fan 10 driven by the engine 7 and a heat exchanger 11 such as a radiator are provided in the engine room 6 on one end side of the engine 7. An intake opening 12 is formed in a portion on a side of an upper wall of the engine guard member 5 where the fan 10 and the heat exchanger 11 are formed, and a discharge opening 13 is formed in a portion on the opposite side of the upper wall. Outside air is introduced into the engine room 6 through the intake opening 12 with rotation of the fan 10 and passes through the heat exchanger 11, and cooled air (discharge wind) is discharged from the discharge opening 13.

On the other hand, a silencer (muffler) 14 is located on the other end side of the engine 7. The exhaust gas emitted from the engine 7 is discharged to the outside through the silencer 14 and an exhaust gas pipe (tail pipe) 15 connected to the silencer 14.

Here, in the known technique, a cylindrical duct 16 is provided at a position below the discharge opening 13 in the engine room 6 so as to extend in the up-down direction in a state where an upper end of the duct 16 is open to the discharge opening 13, and a lower end of the duct 16 is open to the inner side of the engine room 6. A distal end portion 15a of the exhaust gas pipe 15 is bent upward at the lower side of the duct 16 so that the distal end portion 15a is inserted into the duct 16 from the lower end of the duct 16.

By doing so, the discharge wind and the exhaust gas are guided into the duct 16, and both are mixed in the duct 16, whereby the temperature of the exhaust gas is decreased. After that, the discharge wind and the exhaust gas are discharged to the outside, and operating noise in the duct is reduced.

Although the known technique can better decrease the exhaust gas temperature and the operating noise than the conventional structure, the mixture of the exhaust gas and the discharge wind are discharged upward similarly to the conventional structure. Due to this, even if the known technique is applied in particular to the small shovel which does not have a cabin illustrated in FIG. 9, heat and noise still have a large adverse effect on the operator.

Patent Document 1: Japanese Patent Application Publication No. H3-229907

SUMMARY OF THE INVENTION

An object of the present invention is to remarkably reduce an adverse effect of heat and noise on the operator of a small shovel in particular.

A construction machine according to an aspect of the present invention includes: a lower propelling body; and an upper slewing body which is slewably mounted on the lower propelling body, the upper slewing body including: an engine room provided with an intake opening for introducing cooling air from an outside and a discharge opening for discharging cooled air to the outside; a duct provided in the engine room so as to communicate with the discharge opening and adapted to discharge the cooled air to the outside of the engine room through the discharge opening; and an exhaust gas pipe which guides exhaust gas discharged from the engine into the duct, wherein the discharge opening and an outlet of the duct are open downward from the engine room, a portion on a distal end side of the exhaust gas pipe is inserted into the duct, and the duct and the exhaust gas pipe are configured to cause the exhaust gas to be mixed with the cooled air in the duct and cause the mixture of the exhaust gas and the cooled air to be discharged downward from the discharge opening.

EMBODIMENTS OF THE INVENTION

Hereinafter, the first to third embodiments of the present invention will be described with reference to FIGS. 1 to 8.

The respective embodiments are applied to a small shovel (mini shovel).

Figure 9:
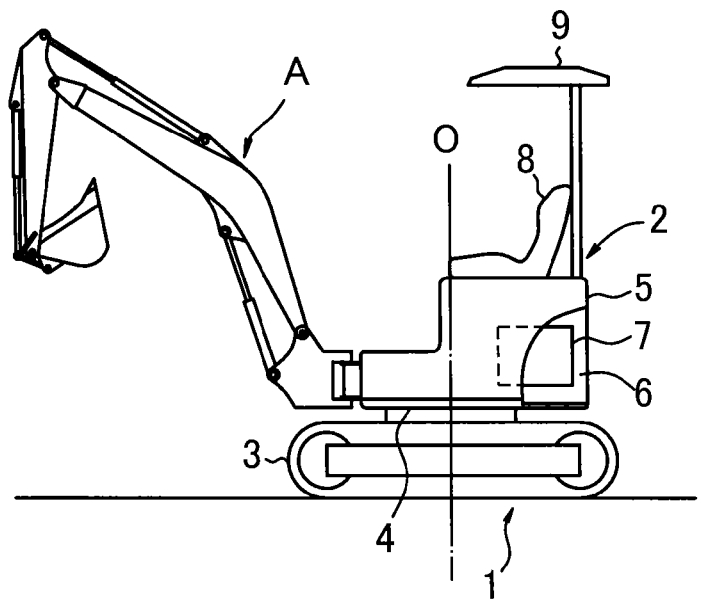
FIG. 9 is a schematic general side view of a small shovel to which the present invention is applied.
Figure 10:
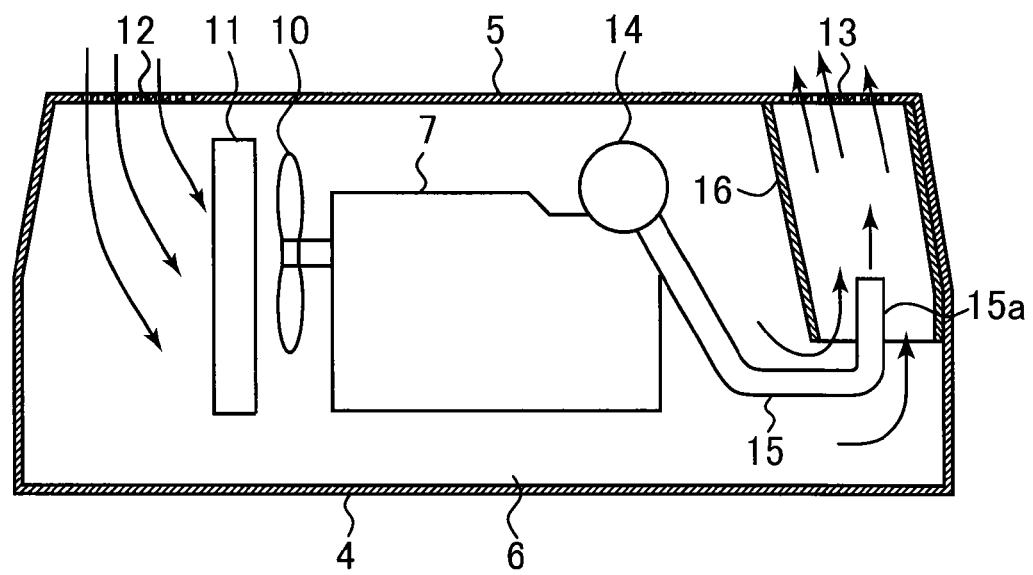
FIG. 10 is a schematic cross-sectional view of an engine room according to a known technique.

In the respective embodiments, the following features (A) to (E) are the same as those of the conventional structure and the known technique illustrated in FIGS. 9 and 10.

(A) A shovel includes a lower propelling body 21, an upper slewing body 22 mounted on the lower propelling body 21 so as to be slewable about an axis (central axis of slewing) O perpendicular to the ground, and an excavating device (not illustrated) attached to the front of the upper slewing body 22.

(B) The lower propelling body 21 includes a car body 23 on which the upper slewing body 22 is mounted and crawler-type propelling devices 25 attached to both left and right sides of the car body 23 and having a crawler 24.

(C) An engine room 28 surrounded by an upper frame 26 and an engine guard member 27 such as a panel or a bonnet is provided at a rear part of the upper frame 26 which forms the upper slewing body 22.

Figure 3:
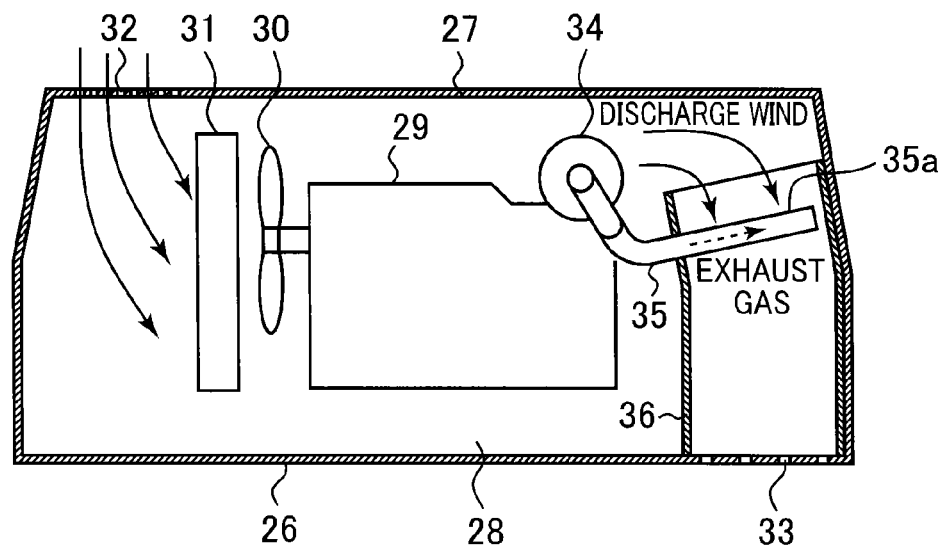
FIG. 3 is a cross-sectional view of an engine room of the small shovel according to the first embodiment.

(D) An engine 29 is accommodated in the engine room 28. As illustrated in FIG. 3, a cooling fan 30 driven by the engine 29 and a heat exchanger 31 such as a radiator are provided in the engine room 28 on one end side of the engine 29. An intake opening 32 is formed in a portion on a side of an upper wall of the engine guard member 27 where the fan 30 and the heat exchanger 31 are set, and a discharge opening 33 is formed in a portion on the opposite side of the upper wall. Outside air is introduced into the engine room 28 through the intake opening 32 with rotation of the fan 30 and passes through the heat exchanger 31, and cooled air (discharge wind) which has cooled the heat exchanger 31 is discharged from the discharge opening 33.

(E) A silencer (muffler) 34 is located on the other end side of the engine 29 in the engine room 28, and the exhaust gas emitted from the engine 29 is discharged to the outside through the silencer 34 and an exhaust gas pipe (tail pipe) 35 connected to the silencer 34.

Figure 1:
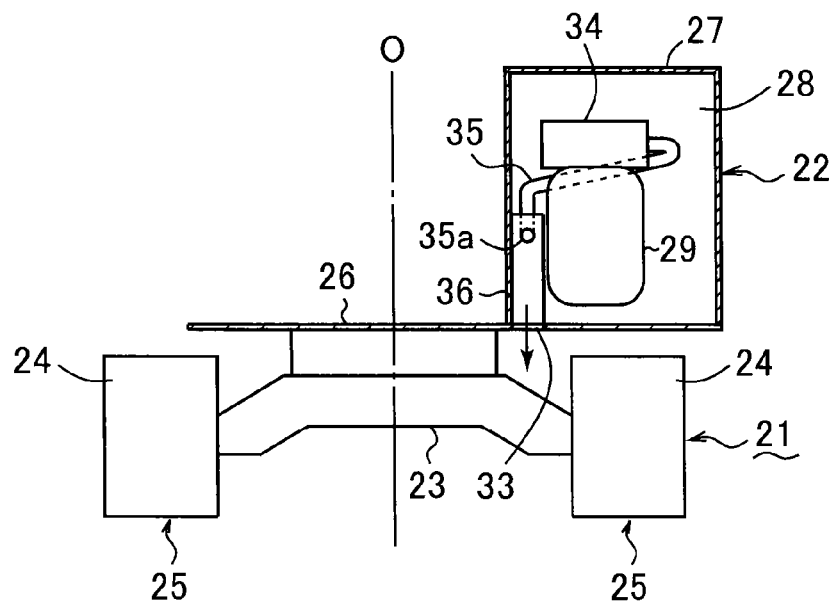
FIG. 1 is a schematic longitudinal cross-sectional view of a small shovel according to a first embodiment of the present invention.
Figure 6:
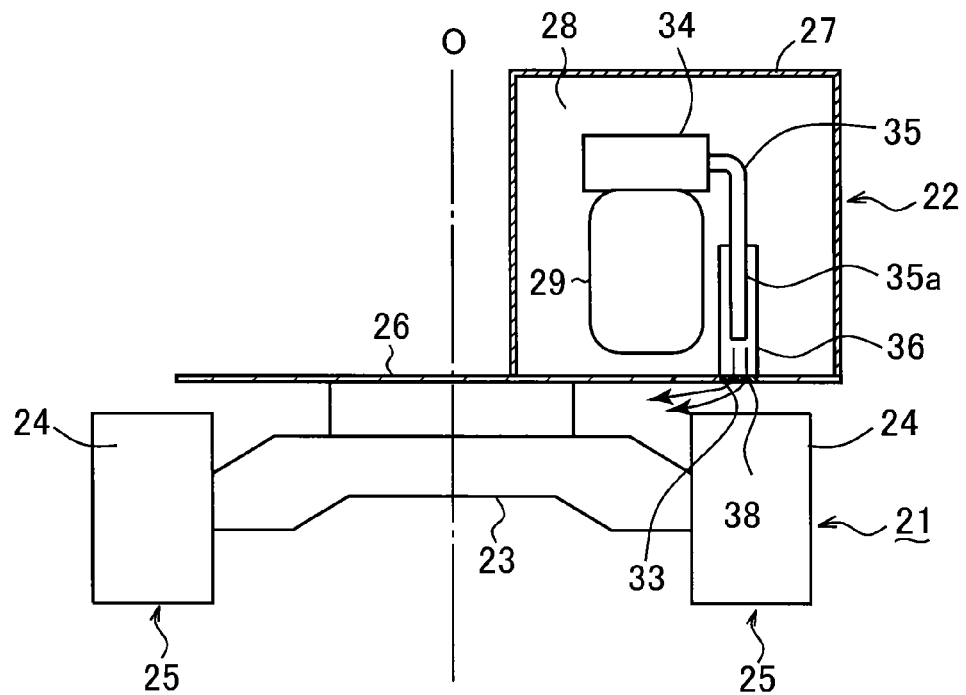
FIG. 6 is a schematic longitudinal cross-sectional view of a small shovel according to a second embodiment of the present invention.
Figure 8:
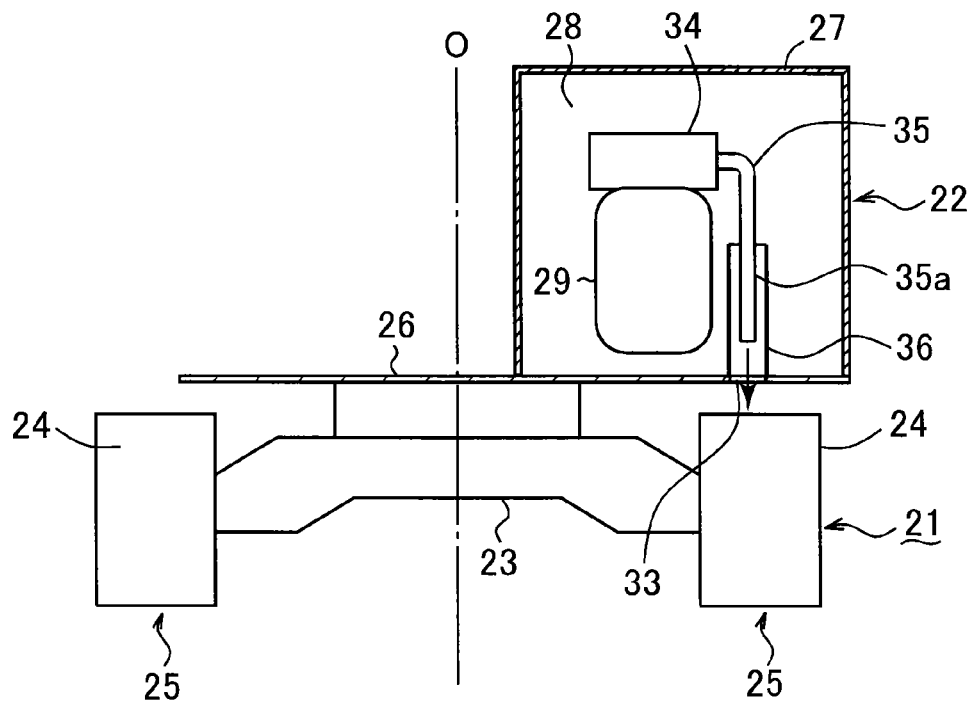
FIG. 8 is a schematic longitudinal cross-sectional view of a small shovel according to a third embodiment of the present invention.

FIGS. 1, 6, and 8 illustrate a state where the upper slewing body 22 is rotated by 90° in relation to a propelling direction of the lower propelling body 21 (that is, a laterally slewing state where the engine room 28 is positioned above the crawler 24 on one side).

First Embodiment (see FIGS. 1 to 5)

Figure 2:
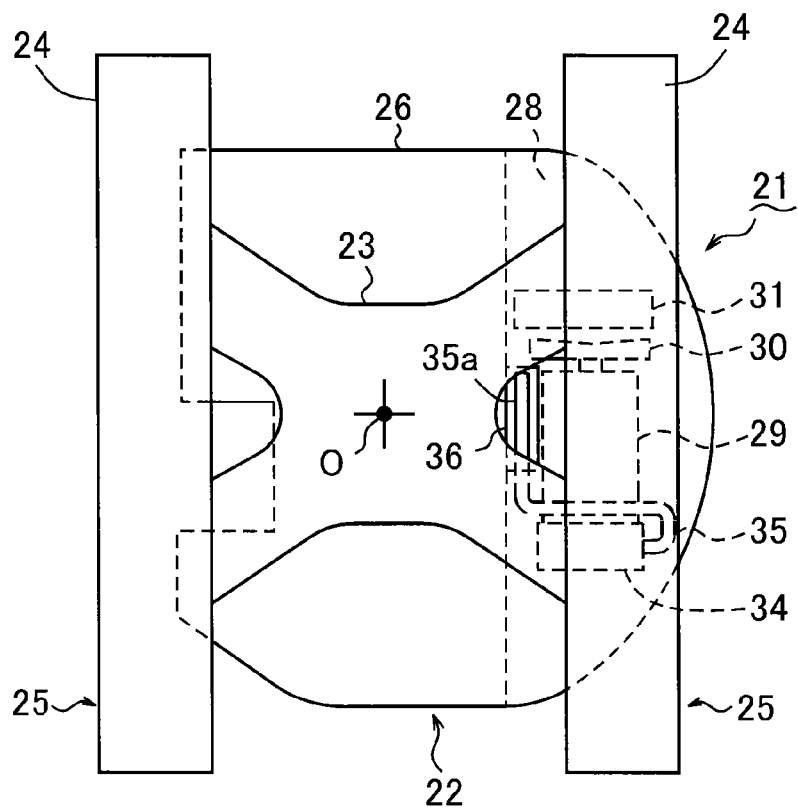
FIG. 2 is a view of the small shovel according to the first embodiment as seen from the lower surface side.

In the first embodiment, as illustrated in FIGS. 1 and 2, the discharge opening 33 is formed in a lower wall (the upper frame 26) of the engine room 28 at a position of the engine room 28, the position being closer to the central axis O of slewing of the upper slewing body 22 and being displaced inward in relation to the upper surface of the crawler 24 when the upper slewing body 22 is in the laterally slewing state. A cylindrical duct 36 is provided on the upper side of the discharge opening 33.

As illustrated in the drawings, the duct 36 is provided so as to extend in the up-down direction in a state where a lower end thereof at an outlet side is open to the discharge opening 33 and an upper end thereof at an inlet side is open into the engine room 28.

The exhaust gas pipe 35 is bent at an intermediate portion thereof so as to extend toward the duct 36. A portion on a distal end side (a side opposite to the engine 29) of the exhaust gas pipe 35 is inserted into the duct 36 while passing through a side wall of the duct 36. That is, an inserted portion 35a which is a portion on the distal end side of the exhaust gas pipe 35 extends in a direction intersecting (preferably orthogonal to as illustrated) the extension direction of the duct 36 and is inserted into the duct 36 in a state of substantially crossing the inside of the duct 36.

Figure 4:
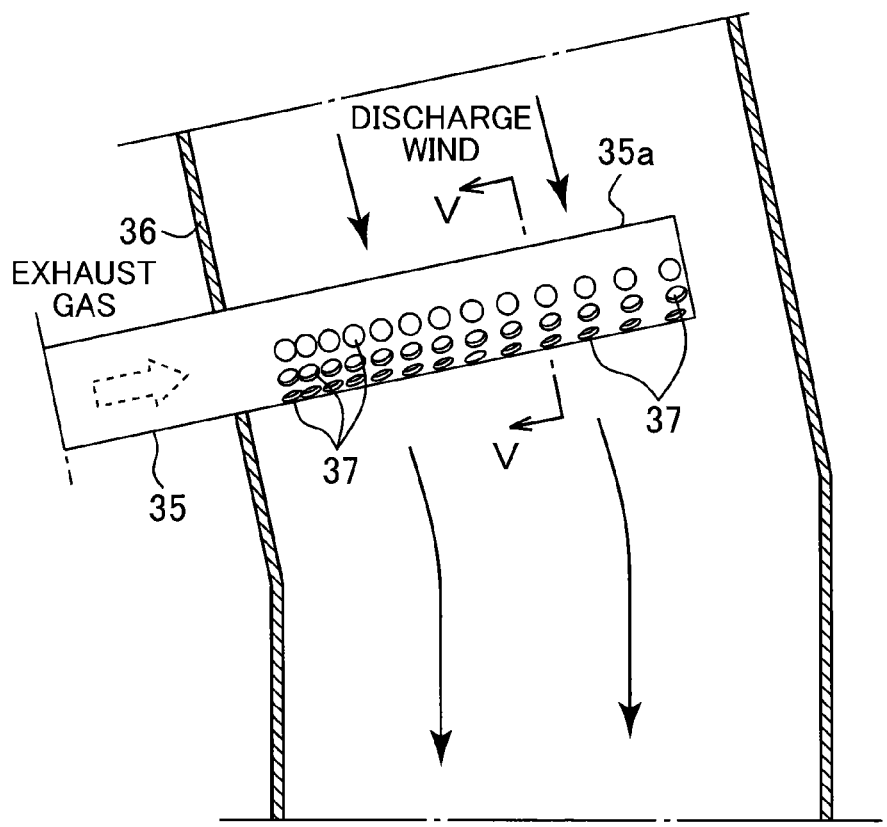
FIG. 4 is a view illustrating a portion of FIG. 3 at an enlarged scale.
Figure 5:
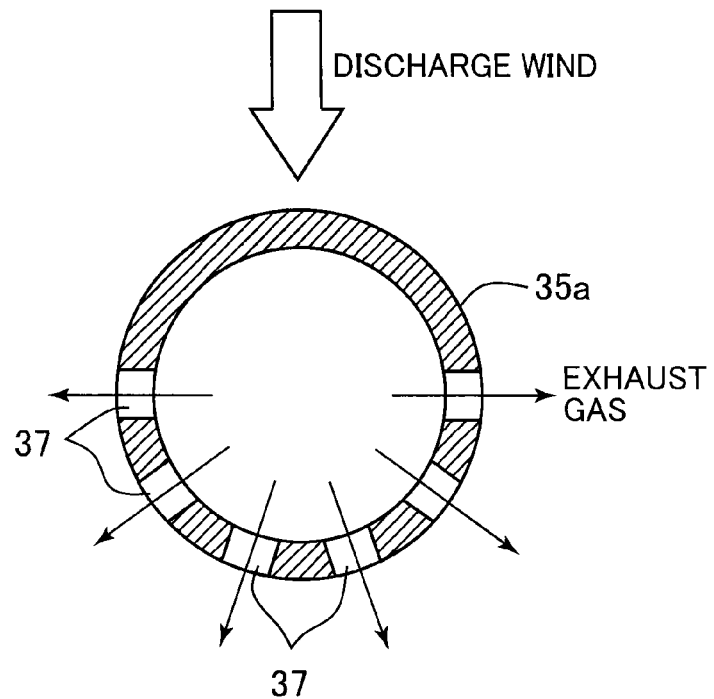
FIG. 5 is an enlarged cross-sectional view along line V-V of FIG. 4.

As illustrated in FIGS. 4 and 5, the inserted portion 35a of the exhaust gas pipe 35 is formed with a plurality of exhaust holes 37 which causes the exhaust gas flowing through the inside of the inserted portion 35a to be jetted into the duct 36 through the exhaust holes 37. The plurality of exhaust holes 37 is formed in a semi-circumferential portion (a semi-circumferential portion on the lower side of a line which is orthogonal to a flowing direction of the discharge wind and extends in a radial direction of the inserted portion 35a) of the inserted portion 35a positioned on the leeward side of the discharge wind which passes through the inside of the duct 36. The exhaust holes 37 are formed at a plurality of different positions of the semi-circumferential portion of the inserted portion 35a so as to be spaced from each other in the circumferential direction and are formed at a plurality of different positions spaced from each other in the longitudinal direction of the inserted portion 35a as illustrated in the drawing.

Moreover, the opening area of the exhaust holes 37 per unit length of the inserted portion 35a gradually decreases as it advances toward the distal end side (the side opposite to the engine 29) of the inserted portion 35a so that the amounts of the exhaust gas discharged from the exhaust holes 37 are substantially equalized in the longitudinal direction of the inserted portion 35a. In other words, the percentage of the opening area of the exhaust holes 37 to the non-opening area of the inserted portion 35a gradually decreases as it advances toward the distal end side of the inserted portion 35a. As a result, the amounts of the exhaust gas discharged from the exhaust holes 37 are substantially equalized in the longitudinal direction of the inserted portion 35a.

Specifically, as illustrated in FIG. 4, the arrangement interval of the exhaust holes 37 in the longitudinal direction of the inserted portion 35a gradually increases as it advances toward the distal end side of the inserted portion 35a. That is, the arrangement density of the exhaust holes 37 gradually decreases as it advances toward the distal end side of the inserted portion 35a.

Moreover, the size of the exhaust holes 37 may be set so that the exhaust hole 37 arranged closer to the distal end side of the inserted portion 35a has a smaller size than that of the exhaust hole 37 arranged away from the distal end side.

The exhaust hole 37 may be a circular hole as illustrated in the drawing and may be a rectangular hole. Alternatively, the exhaust hole 37 may be a slot which is long in the longitudinal direction of the inserted portion 35a. When the exhaust hole 37 is a slot, a width thereof may decrease as it advances toward the distal end side of the inserted portion 35a.

Moreover, in the first embodiment and the second and third embodiments described later, the opening at the distal end of the exhaust gas pipe 35 is closed or is narrowed to have a small opening area.

In the first embodiment, since the mixture of the exhaust gas and the discharge wind is discharged downward (that is, to a side vertically opposite to the driver's seat) from the engine room 28, it is possible to remarkably reduce an adverse effect of heat and noise on an operator of the small shovel exemplified in the embodiment in particular.

Moreover, the discharge opening 33 is open downward at a position of the engine room 28 closer to the center of rotation of the upper slewing body 22, the position being displaced inward from the crawler 24 when the upper slewing body 22 is in the laterally slewing state. Hence, the discharged mixture does not blow directly to the crawler 24 in the laterally slewing state where the engine room 28 is positioned above the crawler 24 on one side. Due to this, it is possible to prevent a rubber crawler generally employed in a small shovel in particular from deteriorating with the heat of the mixture to decreasing durability.

Moreover, since the mixture is discharged directly from the discharge opening 33, discharge resistance is small and flow performance of exhaust gas is improved.

Further, in the first embodiment, as illustrated in FIGS. 4 and 5, the exhaust gas is jetted into the duct 36 in a radial form with respect to the center in the radial direction of the inserted portion 35a from the semi-circumferential portion of the inserted portion 35a positioned on the leeward side of the discharge wind and from a portion extending approximately over the entire length of the inserted portion 35a.

That is, the exhaust gas is jetted in the following manner.

(i) The exhaust gas is jetted in a direction different from the flowing direction of the discharge wind in the duct 36.

(ii) The exhaust gas is jetted so as to be dispersed in the circumferential direction and the longitudinal direction of the inserted portion 35a.

According to the configuration of the first embodiment, first, due to the effect that the exhaust gas is jetted in the different direction as indicated in (i), since the exhaust gas of which the pressure and flow rate are higher than the discharge wind stays long in a large area in the cross-section of the duct 36, the exhaust gas easily mixes with the discharge wind of which the pressure and the flow rate are low.

Second, due to the effect that the exhaust gas is dispersed in the circumferential direction and the longitudinal direction as indicated in (ii), the exhaust gas mixes with the discharge wind in a larger area in the duct 36.

Due to the synergistic of the two effects, the mixing efficiency of the exhaust gas and the discharge wind can be improved. As a result, the exhaust gas and the discharge wind can be discharged to the outside from the duct 36 and the discharge opening 33 after the temperature of the exhaust gas is reliably decreased to a desired temperature. Specifically, for example, the exhaust gas and the discharge wind can be discharged to the outside after the temperature of the exhaust gas is decreased from 500° C. to 100° C.

Moreover, due to the exhaust gas jetting effects as indicated in (i) and (ii), the discharge sound (exhaust sound) of the exhaust gas easily makes contact with the inner surface of the duct 36, and sound which is emitted from the engine 29 and the silencer 14 and comes outside while riding on the discharge wind is easily dispersed and reflected in the duct 36 together with the exhaust gas. Thus, it is possible to reduce the operating noise emitted to the outside.

That is, according to the first embodiment, the exhaust gas temperature reduction effect and the noise reduction effect can be improved more remarkably than the known technique.

In order to further improve the noise reduction effect, it is preferable that a noise absorbing material such as glass wool is provided on the inner surface of the duct 36.

Figure 7:
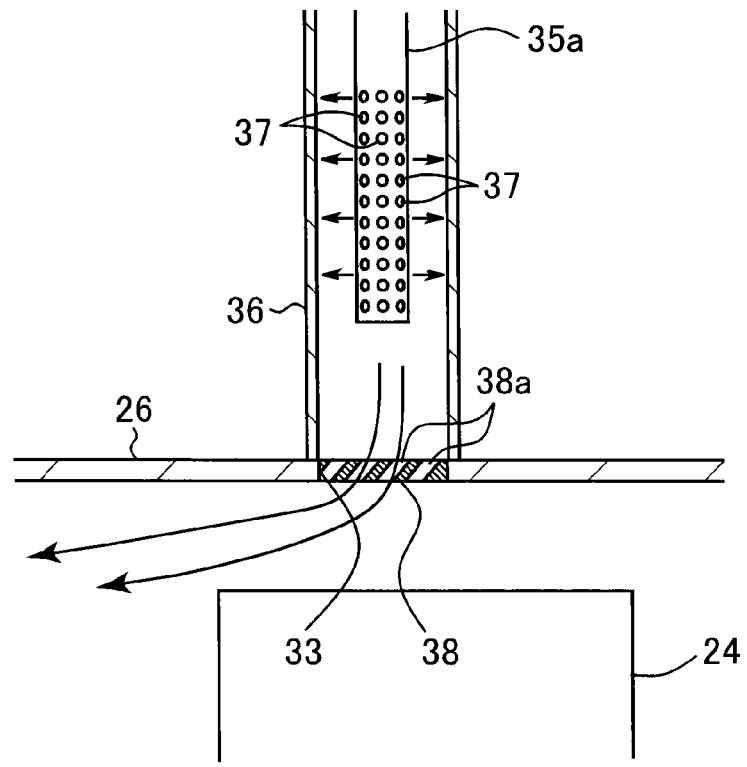
FIG. 7 is a view illustrating a portion of FIG. 6 at an enlarged scale.

Second Embodiment (see FIGS. 6 and 7)

In the second and third embodiments, only the differences from the first embodiment will be described.

In the second embodiment, as a first difference, the discharge opening 33 is formed in a lower wall (the upper frame 26) of the engine room 28 at a position of the engine room 28 on the opposite side of the central axis O of slewing, the position facing the upper surface of the crawler 24 at one side when the upper slewing body 22 is in the laterally slewing state, the duct 36 is provided on the upper side of the discharge opening 33, and a wind guiding plate 38 is provided in the discharge opening 33 as a wind guiding member.

As illustrated in FIG. 7 at an enlarged scale, the wind guiding plate 38 has a plurality of holes 38a which is inclined inward so as to guide the mixture so that the mixture is discharged toward a position displaced inward (toward the central axis O of slewing) from the upper surface of the crawler 24. Due to the plurality of holes 38a, the mixture is discharged so as to be guided toward the inside further than the upper surface of the crawler 24.

A plurality of inclined wind guiding plates as wind guiding members may be provided on an outer surface (the lower surface of the upper frame 26) of the discharge opening 33.

As a second difference, the inserted portion 35a on the distal end side of the exhaust gas pipe 35 is inserted downward directly into the duct 36 from the upper side of the duct 36, and the exhaust holes 37, which causes the exhaust gas to be jetted laterally through the exhaust holes 37, are formed at respective positions different circumferentially of the entire circumferential portion of the inserted portion 35a from each other, the respective positions being spaced from each other in the circumferential direction of the entire circumferential portion, and formed at respective positions different longitudinally of the inserted portion 35a from each other, the respective positions being spaced from each other in the longitudinal direction of the inserted portion 35a.

In the drawings, although holes having the same diameter and serving as the exhaust holes 37 are formed at equal intervals in the longitudinal direction and the circumferential direction of the inserted portion 35a, the arrangement interval of the exhaust holes 37 and/or the size of the exhaust holes 37 may be changed depending on the position on the inserted portion 35a similarly to the first embodiment. Specifically, the arrangement interval of the exhaust holes 37 in the longitudinal direction of the inserted portion 35a may gradually increase as it advances toward the distal end side of the inserted portion 35a so that the amounts of the exhaust gas discharged from the exhaust holes 37 are substantially equalized in the longitudinal direction of the inserted portion 35a. That is, the arrangement density of the exhaust holes 37 may gradually decrease as it advances toward the distal end side of the inserted portion 35a. Moreover, the size of the exhaust holes 37 may be set so that the exhaust hole 37 arranged closer to the distal end side of the inserted portion 35a has a smaller size than that of the exhaust hole 37 arranged away from the distal end side.

In the second embodiment, similarly to the first embodiment, since the mixture is discharged toward the position displaced from the upper surface of the crawler 24, deterioration of a rubber crawler due to heat can be suppressed. Moreover, in the second embodiment, the degree of freedom in the position where the discharge opening 33 is formed increases. Due to this, the works for the design and installation associated with a device layout and the shape and arrangement of the duct become easy.

Moreover, in the second embodiment, since the inserted portion 35a on the distal end side of the exhaust gas pipe 35 is inserted into the duct 36 from the upper side of the duct 36, it is not necessary to insert the distal end portion of the exhaust gas pipe 35 through the side wall of the duct 36 and to form a hole for the insertion in the duct 36. Due to this, the works for processing and installation of the exhaust gas pipe 35 and the duct 36 become easy.

Third Embodiment (see FIG. 8)

In the third embodiment, a configuration in which the wind guiding plate 38 is removed from the configuration of the second embodiment and the mixture is discharged downward directly from the discharge opening 33 (that is, the mixture is discharged toward the upper surface of the crawler 24) is employed as a configuration suitable for a shovel which uses a metal crawler. The other configuration of the third embodiment is the same as that of the second embodiment.

According to the configuration of the third embodiment, it is possible to simplify the structure because the wind guiding plate 38 is done away with while exploiting the freedom in positioning the discharge opening 33.

The configuration of the first embodiment in which the discharge opening 33 is formed at a position of the lower wall (the upper frame 26) of the engine room 28, the position displaced from the upper surface of the crawler 24 when the upper slewing body 22 is in the laterally slewing state, may be combined with the configuration of the second and third embodiments in which the inserted portion 35a on the distal end side of the exhaust gas pipe 35 is inserted directly into the duct 36 from the upper side.

Moreover, the configuration of the first embodiment in which the inserted portion 35a on the distal end side of the exhaust gas pipe 35 is passed through the side wall of the duct 36 and is inserted into the duct 36 may be combined with the configuration in which the discharge opening 33 is formed at a position of the lower wall (the upper frame 26) of the engine room 28, the position facing the upper surface of the crawler 24 when the upper slewing body 22 is in the laterally slewing state.

Moreover, the present invention is not limited to a hydraulic shovel, but similarly to the above, can be applied to another construction machine having a configuration in which the construction machine includes an engine room and the cooling air and the exhaust gas are discharged to the outside from the engine room.

Summary of Embodiments

The embodiments are summarized as follows.

A construction machine according to the embodiment includes: a lower propelling body; and an upper slewing body which is slewably mounted on the lower propelling body, the upper slewing body including: an engine room provided with an intake opening for introducing cooling air from an outside and a discharge opening for discharging cooled air to the outside; a duct provided in the engine room so as to communicate with the discharge opening and adapted to discharge the cooled air to the outside of the engine room through the discharge opening; and an exhaust gas pipe which guides exhaust gas discharged from the engine into the duct, wherein the discharge opening and an outlet of the duct are open downward from the engine room, a portion on a distal end side of the exhaust gas pipe is inserted into the duct, and the duct and the exhaust gas pipe are configured to cause the exhaust gas to be mixed with the cooled air in the duct and cause the mixture of the exhaust gas and the cooled air to be discharged downward from the discharge opening.

According to this configuration, since the mixture of the exhaust gas and the discharge wind is discharged downward (that is, to a side vertically opposite to the driver's seat) from the engine room, it is possible to remarkably reduce an adverse effect of heat and noise on an operator of a small shovel in particular.

In the construction machine, it is preferable that the lower propelling body includes a car body on which the upper slewing body is mounted and crawler-type propelling devices attached to both left and right sides of the car body, wherein each of the crawler-type propelling devices includes a crawler, and the construction machine is configured such that the mixture discharged from the discharge opening is discharged toward a position displaced from an upper surface of the crawler when the upper slewing body is in a laterally slewing state where the engine room is disposed on the upper side of the crawler of any of the crawler-type propelling devices on both left and right sides.

According to this configuration, since the mixture is discharged toward the position displaced from the crawler when the upper slewing body is in the laterally slewing state, it is possible to prevent a rubber crawler generally employed in a small shovel in particular from deteriorating with the heat of the mixture.

In this case, the discharge opening may be open downward at a position of the engine room, the position being closer to the center of slewing of the upper slewing body and being displaced from the upper surface of the crawler when the upper slewing body is in the laterally slewing state. Alternatively, the discharge opening may be open downward at a position which faces the upper surface of the crawler when the upper slewing body is in the laterally slewing state, and the discharge opening is provided with a wind guiding member which guides the mixture so that the mixture is discharged toward a position displaced from the upper surface of the crawler.

According to the former configuration, since the discharge resistance is small, flow performance of exhaust gas of the construction machine is improved. On the other hand, according to the latter configuration, since the degree of freedom in the position where the discharge opening is formed increases, the works for the design and installation associated with a device layout and the shape and arrangement of the duct become easy.

In the construction machine, it is preferable that an inserted portion of the exhaust gas pipe inserted into the duct is formed with an exhaust hole which causes the exhaust gas to be discharged in a direction different from a flowing direction of discharge wind in the duct through the exhaust hole.

According to this configuration, the exhaust gas is discharged in the duct in a direction different from the flowing direction of the discharge wind rather than being discharged in the flowing direction of the discharge wind as in the known technique. Here, since the exhaust gas has higher pressure and flow rate than the discharge wind, the exhaust gas is mixed with the discharge wind in a large area in the cross-section of the duct when the exhaust gas is jetted in the duct in a direction different from the flowing direction of the discharge wind. Due to this, the mixing efficiency of the exhaust gas and the discharge wind is improved, and the effect of decreasing the temperature of the exhaust gas can be improved. Moreover, according to this configuration, since the exhaust gas is jetted in a direction different from the flowing direction of the discharge wind so as to be dispersed in the duct, it is possible to obtain a sound damping effect resulting from reflection of sound on the inner surface of the duct and to thereby improve the effect of reducing noise in the duct. As a result, it is possible to improve the noise reduction effect.

In the construction machine, an inserted portion of the exhaust gas pipe inserted into the duct may be formed with an exhaust hole which causes the exhaust gas to be discharged so as to be dispersed in a longitudinal direction of the exhaust gas pipe through the exhaust hole.

According to this configuration, since the exhaust gas is discharged so as to be dispersed in the longitudinal direction of the exhaust gas pipe in the duct, it is possible to improve the mixing efficiency of the exhaust gas and the discharge wind and the sound reduction effect and to thereby improve the effect of reducing the temperature of the exhaust gas and the noise reduction effect.

In this case, it is preferable that the exhaust holes are formed at respective positions different longitudinally of the inserted portion of the exhaust gas pipe from each other, and an opening area of the exhaust holes per unit length of the inserted portion gradually decreases toward a distal end side of the inserted portion so that amounts of the exhaust gas discharged from the exhaust holes are substantially equalized in the longitudinal direction of the inserted portion.

According to this configuration, the percentage of the opening area of the exhaust holes is relatively small on the distal end side of the inserted portion where the flow rate of the exhaust gas is highest, and the percentage of the opening area of the exhaust holes gradually increases as it advances from the distal end side toward the opposite side where the flow rate of the exhaust gas is low. Due to this, the discharge amounts of the exhaust gas are substantially equalized in the longitudinal direction of the exhaust gas pipe. As a result, it is advantageous in terms of the mixing efficiency of the exhaust gas and the discharge wind and the sound reduction effect.

In the construction machine, an inserted portion of the exhaust gas pipe inserted into the duct may be formed with an exhaust hole which causes the exhaust gas to be discharged so as to be dispersed in a circumferential direction of the exhaust gas pipe through the exhaust hole.

According to this configuration, since the exhaust gas is discharged so as to be dispersed in the circumferential direction of the exhaust gas pipe in the duct, it is possible to improve the mixing efficiency of the exhaust gas and the discharge wind and the sound reduction effect and to thereby improve the effect of reducing the temperature of the exhaust gas and the noise reduction effect.

By combining the above configuration with the configuration of the exhaust hole which causes the exhaust gas to be discharged so as to be dispersed in the longitudinal direction of the exhaust gas pipe, the exhaust hole which causes the exhaust gas to be discharged so as to be dispersed in both the longitudinal direction and the circumferential direction of the exhaust gas pipe may be provided.

In the construction machine, it is preferable that the portion on a distal end side of the exhaust gas pipe is inserted into the duct so as to extend in a direction intersecting an extension direction of the duct.

By doing so, the inserted portion of the exhaust gas pipe can be positioned over a large area of the cross-section of the duct in a state of crossing the inside of the duct. Thus, in any one of the case where the exhaust hole which causes the exhaust gas to be discharged in a direction different from the flowing direction of the discharge wind is formed and the case where the exhaust hole which causes the exhaust gas to be discharged so as to be dispersed in the longitudinal direction or the circumferential direction of the exhaust gas pipe is formed, the exhaust gas can be easily jetted in a large area in the duct.

In this case, it is preferable that an inserted portion of the exhaust gas pipe inserted into the duct is formed with an exhaust hole for discharging the exhaust gas, and the exhaust hole is arranged in a semi-circumferential portion of the inserted portion, the semi-circumferential portion positioned on a leeward side of the discharge wind in the duct.

By doing so, it is possible to suppress the discharge wind and the exhaust gas from colliding with each other in the duct to generate sound and to prevent the exhaust gas in the duct from hampering ventilation.

As described above, according to the embodiments, it is possible to remarkably reduce an adverse effect of heat and noise on an operator of a small shovel in particular and to dramatically improve a working environment of the operator.

The invention claimed is:

1. A construction machine comprising:
a lower propelling body; and
an upper slewing body which is slewably mounted on the lower propelling body, the upper slewing body including:
an engine room provided with an intake opening for introducing cooling air from an outside and a discharge opening for discharging cooling air to the outside;
a duct provided in the engine room so as to communicate with the discharge opening and adapted to discharge the cooling air to the outside of the engine room through the discharge opening; and
an exhaust gas pipe which guides exhaust gas discharged from the engine into the duct, wherein
the duct has an inlet which is opened in the engine room to allow the cooling air in the engine room to be introduced into an inner space of the duct, and an outlet which is opened to allow the cooling air in the inner space of the duct to be discharged, the inlet being arranged above the outlet to allow the cooling air in the engine room to flow downward from the inlet to the outlet,
the discharge opening and the outlet of the duct are open downward from the engine room,
a portion on a distal end side of the exhaust gas pipe is inserted into the inner space of the duct and has an opening in the duct to discharge the exhaust gas to the inner space of the duct through the opening to cause the exhaust gas to be mixed with the cooling air flowing from the inlet to the outlet in the inner space of the duct and cause the mixture of the exhaust gas and the cooling air to be discharged downward from the discharge opening.

2. The construction machine according to claim 1, wherein the lower propelling body includes a car body on which the upper slewing body is mounted and crawler-type propelling devices attached to both left and right sides of the car body, wherein
each of the crawler-type propelling devices includes a crawler, and
the construction machine is configured such that the mixture discharged from the discharge opening is discharged toward a position displaced from an upper surface of the crawler when the upper slewing body is in a laterally slewing state where the engine room is disposed on the upper side of the crawler of any of the crawler-type propelling devices on both left and right sides.

3. The construction machine according to claim 2, wherein the discharge opening is open downward at a position of the engine room, the position being closer to the center of slewing of the upper slewing body and being displaced from the upper surface of the crawler when the upper slewing body is in the laterally slewing state.

4. The construction machine according to claim 2, wherein the discharge opening is open downward at a position which faces the upper surface of the crawler when the upper slewing body is in the laterally slewing state, and the discharge opening is provided with a wind guiding member which guides the mixture so that the mixture is discharged toward a position displaced from the upper surface of the crawler.

5. The construction machine according to claim 1, wherein an inserted portion of the exhaust gas pipe inserted into the duct is formed with an exhaust hole which causes the exhaust gas to be discharged through the exhaust hole in a direction different from a flowing direction of discharge wind in the duct.

6. The construction machine according to claim 1, wherein an inserted portion of the exhaust gas pipe inserted into the duct is formed with an exhaust hole which causes the exhaust gas to be discharged so as to be dispersed in a longitudinal direction of the exhaust gas pipe through the exhaust hole.

7. The construction machine according to claim 1, wherein an inserted portion of the exhaust gas pipe inserted into the duct is formed with a plurality of exhaust holes which cause the exhaust gas to be discharged so as to be dispersed in a longitudinal direction of the exhaust gas pipe through the exhaust holes, the exhaust holes are formed at respective positions different longitudinally of the inserted portion of the exhaust gas pipe from each other, and an opening area of the exhaust holes per unit length of the inserted portion gradually decreases toward a distal end side of the inserted portion so that amounts of the exhaust gas discharged from the exhaust holes are substantially equalized in the longitudinal direction of the inserted portion.

8. The construction machine according to claim 1, wherein an inserted portion of the exhaust gas pipe inserted into the duct is formed with an exhaust hole which causes the exhaust gas to be discharged so as to be dispersed in a circumferential direction of the exhaust gas pipe through the exhaust hole.

9. The construction machine according to claim 1, wherein the portion on the distal end side of the exhaust gas pipe is inserted into the duct so as to extend in a direction intersecting an extension direction of the duct.

10. The construction machine according to claim 9, wherein an inserted portion of the exhaust gas pipe inserted into the duct is formed with an exhaust hole for discharging the exhaust gas, and the exhaust hole is arranged in a semi-circumferential portion of the inserted portion, the semi-circumferential portion positioned on a leeward side of the discharge wind in the duct.

* * * * *